US012614981B2

(12) United States Patent (10) Patent No.: US 12,614,981 B2
Lee et al. (45) Date of Patent: Apr. 28, 2026

(54) POWER SUPPLY CIRCUIT AND DYNAMIC VOLTAGE ADJUSTMENT METHOD

(71) Applicant: PowerX Semiconductor Corporation, Hsinchu County (TW)

(72) Inventors: Tsung-Tze Lee, Hsinchu County (TW); Chia-Hung Tsen, Hsinchu County (TW); Chien-Ming Hsu, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 29 days.

(21) Appl. No.: 18/442,118

(22) Filed: Feb. 15, 2024

(65) Prior Publication Data

US 2025/0211104 A1 Jun. 26, 2025

(30) Foreign Application Priority Data

Dec. 25, 2023 (TW) .................................. 112150592

(51) Int. Cl.
*H02M 3/07* (2006.01)

(52) U.S. Cl.
CPC .................................... *H02M 3/073* (2013.01)

(58) Field of Classification Search
CPC ............ H02M 3/07; H02M 3/06; H02M 3/04; H02M 3/02; H02M 3/073; H02M 3/075; H02M 3/076; H02M 3/077
See application file for complete search history.

(56) References Cited

U.S. PATENT DOCUMENTS

| | | | |
|---|---|---|---|
| 4,797,899 A | 1/1989 | Fuller et al. | |
| 5,729,172 A * | 3/1998 | Tsukada ................ | H02M 3/073 |
| | | | 327/390 |
| 6,208,197 B1 | 3/2001 | Ternullo, Jr. et al. | |
| 7,649,397 B2 * | 1/2010 | Son ........................ | G11C 5/143 |
| | | | 327/321 |
| 2004/0189270 A1 | 9/2004 | Harrison | |
| 2005/0264347 A1 | 12/2005 | Gyohten et al. | |
| 2006/0044052 A1 | 3/2006 | Hashimoto | |
| 2013/0148456 A1 | 6/2013 | Cho et al. | |
| 2013/0257521 A1 | 10/2013 | Syed et al. | |

(Continued)

FOREIGN PATENT DOCUMENTS

| | | |
|---|---|---|
| CN | 116365481 A | 6/2023 |
| TW | 202218339 A | 5/2022 |
| TW | M654134 U | 4/2024 |

*Primary Examiner* — Diana J. Cheng

(74) *Attorney, Agent, or Firm* — CKC & Partners Co., LLC

(57) ABSTRACT

A power supply circuit includes a clock buffer, a charge pump, a control circuit and a voltage clamp circuit. The clock buffer is configured to generate an adjusted clock signal according to a clock signal and level control signal. The clock signal includes a preset level. The charge pump is coupled to the clock buffer to generate an output signal according to adjusted clock signal and a system voltage. The control circuit is coupled to the charge pump to generate a charge pump control signal according to the output signal. The voltage clamp circuit is coupled between the control circuit and clock buffer to receive the charge pump control signal and a system voltage. The voltage clamp circuit outputs a level control signal according to the charge pump control signal. In response to a level of the level control signal, the adjusted clock signal includes an adjusted level.

18 Claims, 10 Drawing Sheets

100

(56) References Cited

U.S. PATENT DOCUMENTS

| | | |
|---|---|---|
| 2021/0258007 A1 | 8/2021 | Wu |
| 2022/0337160 A1 | 10/2022 | Zeinali et al. |
| 2023/0268892 A1 | 8/2023 | Chiu |

* cited by examiner

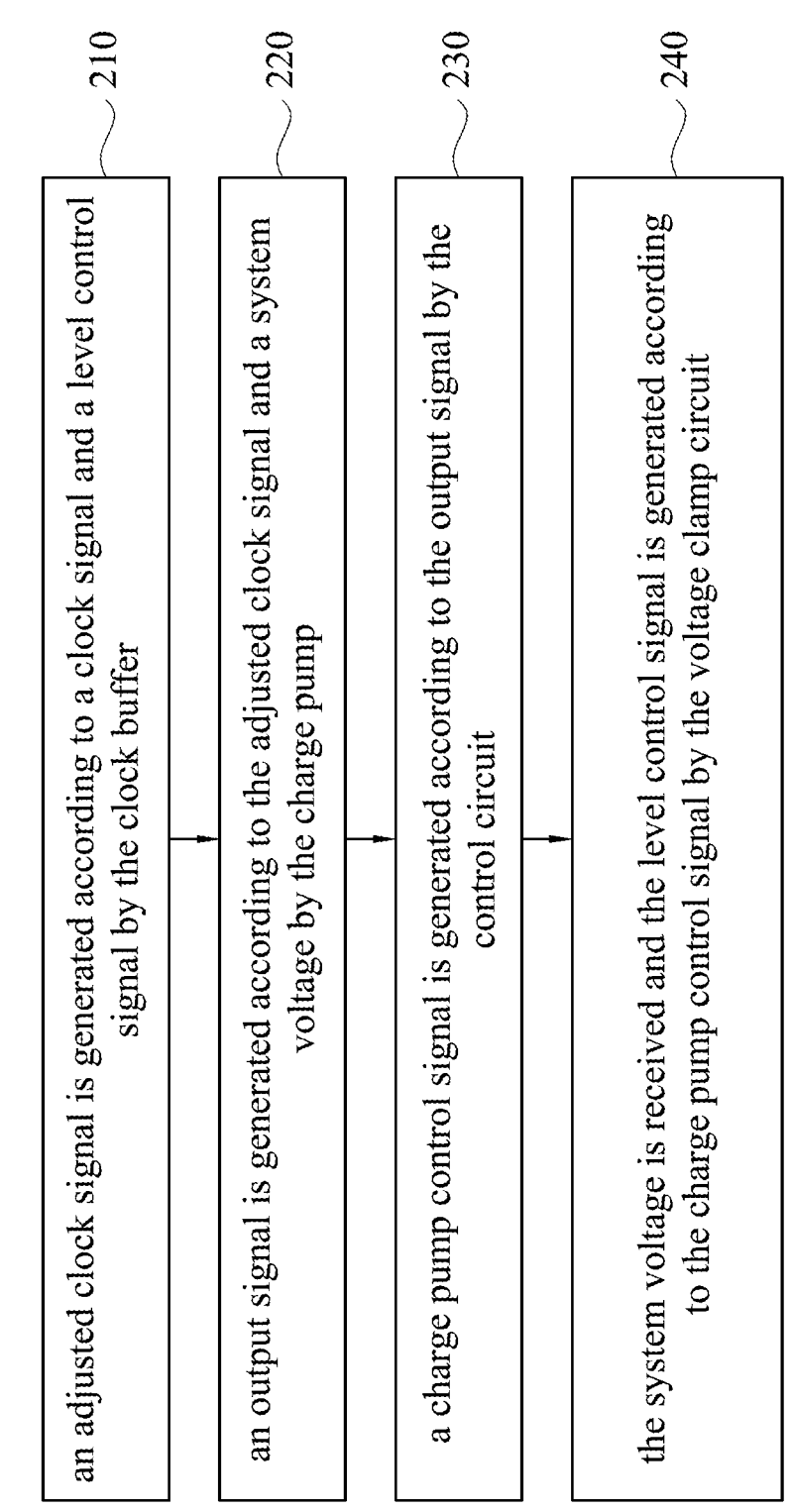

200

210 an adjusted clock signal is generated according to a clock signal and a level control signal by the clock buffer

220 an output signal is generated according to the adjusted clock signal and a system voltage by the charge pump

230 a charge pump control signal is generated according to the output signal by the control circuit

240 the system voltage is received and the level control signal is generated according to the charge pump control signal by the voltage clamp circuit

Fig. 2

POWER SUPPLY CIRCUIT AND DYNAMIC VOLTAGE ADJUSTMENT METHOD

CROSS-REFERENCE TO RELATED APPLICATION

This application claims priority to Taiwan Application Serial Number 112150592, filed Dec. 25, 2023, which is herein incorporated by reference.

BACKGROUND

Field of Invention

The present disclosure relates to a power supply circuit. More particularly, the present disclosure relates to a power supply circuit and a dynamic voltage adjustment method applicable to a charge pump.

Description of Related Art

Conventional control circuits in a charge pump use amplifiers (comparators) to convert feedback analog control signals into digital control signals, to control an output voltage of a charge pump. However, each of digital control signals only has a high logic level and a low logic level, that is to say, each of the control circuits only has two states: on and off. When a reaction time in a control circuit is relatively long, it causes the output voltage of the charge pump to be either too high too low. Furthermore, the use of an amplifier in a control circuit may occupy more circuit area and increase the power consumption of the control circuit.

For the foregoing reasons, there is a need for providing a power supply circuit and a dynamic voltage adjustment method to solve the above problems encountered in related art approaches.

SUMMARY

One aspect of the present disclosure provides a power supply circuit. The power supply circuit includes a clock buffer, a charge pump, a control circuit and a voltage clamp circuit. The clock buffer is configured to generate an adjusted clock signal according to a clock signal and a level control signal. The clock signal includes a preset level. The charge pump is coupled to the clock buffer, and is configured to generate an output signal according to the adjusted clock signal and a system voltage. The control circuit is coupled to the charge pump, and is configured to generate a charge pump control signal according to the output signal. The voltage clamp circuit is coupled between the control circuit and the clock buffer, and is configured to receive the system voltage and the charge pump control signal. The voltage clamp circuit is configured to output the level control signal according to the charge pump control signal. The adjusted clock signal includes an adjusted level in response to a level of the level control signal.

Another aspect of the present disclosure provides a dynamic voltage adjustment method. The dynamic voltage adjustment method includes following steps: generating an adjusted clock signal according to a clock signal and a level control signal by the clock buffer, wherein the clock signal includes a preset level; generating an output signal according to the adjusted clock signal and a system voltage by the charge pump; generating a charge pump control signal according to the output signal by the control circuit; and receiving the system voltage and generating the level control signal according to the charge pump control signal by the voltage clamp circuit. The adjusted clock signal includes an adjusted level in response to a level of the level control signal.

Aiming at solving the aforementioned shortcomings and deficiencies in related art approaches, the present disclosure provides a power supply circuit and a dynamic voltage adjustment method. With the aid of a power supply circuit of the present disclosure, the need for using an amplifier to compare voltages to output a digital control signal can be omitted. In addition, a power supply circuit can significantly reduce the area occupied by components and reduce power consumption, thereby reducing the layout complexity of the circuit.

BRIEF DESCRIPTION OF THE DRAWINGS

The present disclosure can be more fully understood by reading the following detailed description of the embodiment, with reference made to the accompanying drawings as follows:

FIG. 2 depicts a flowchart of a dynamic voltage adjustment method according to one embodiment of the present disclosure;

DETAILED DESCRIPTION

Figure 1:
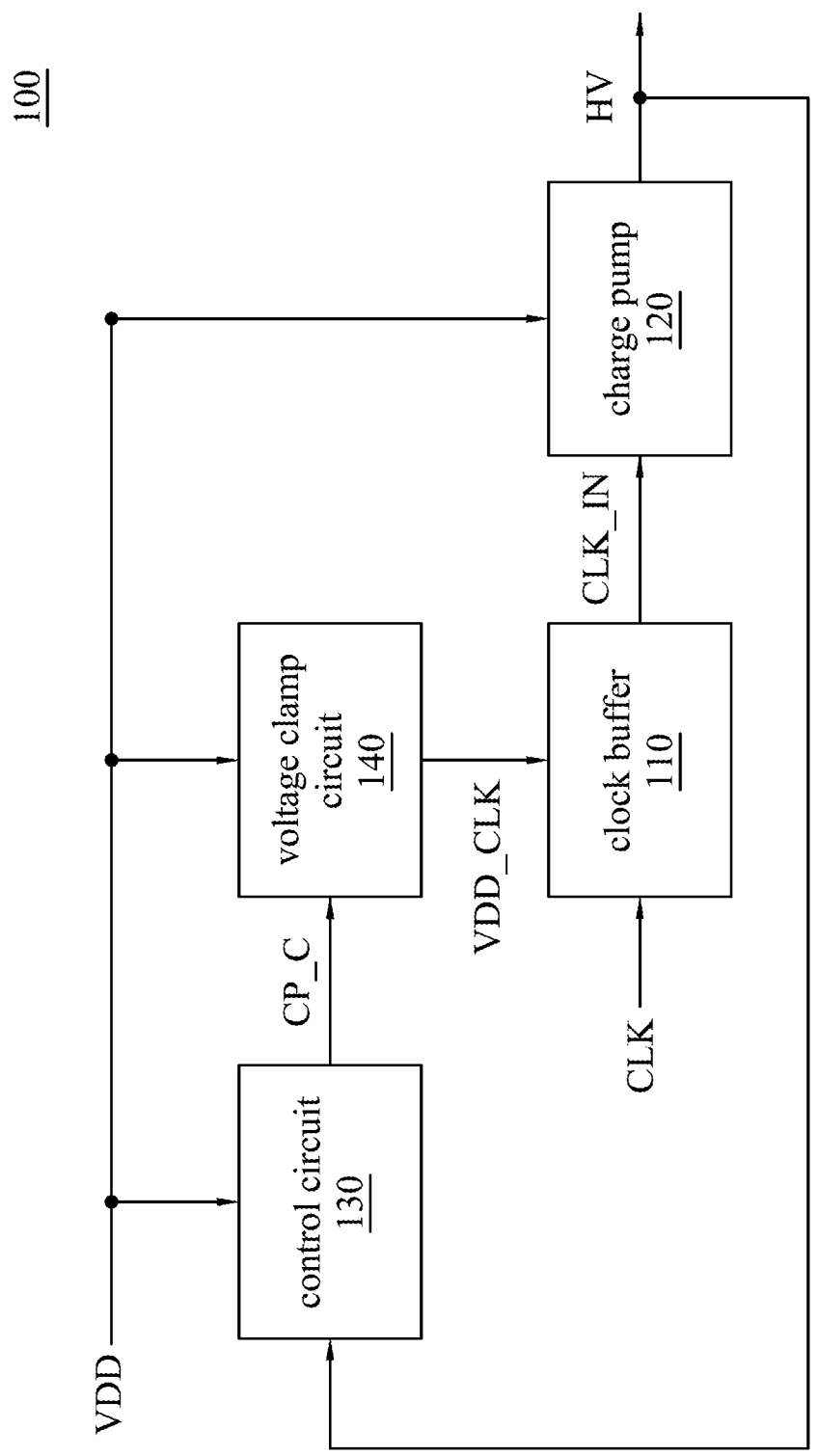
FIG. 1 depicts a schematic diagram of a power supply circuit according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of a power supply circuit 100 according to one embodiment of the present disclosure. In some embodiments, please refer to FIG. 1, the power supply circuit 100 includes a clock buffer 110, a charge pump 120, a control circuit 130 and a voltage clamp circuit 140. The charge pump 120 is coupled to the clock buffer 110. The control circuit 130 is coupled to the charge pump 120. The voltage clamp circuit 140 is coupled between the control circuit 130 and the clock buffer 110.

In some embodiments, the clock buffer 110 is configured to an adjusted clock signal CLK_IN according to a clock signal CLK and a level control signal VDD_CLK to the charge pump 120. When the voltage level of the level control signal VDD_CLK is lower, the voltage level of the adjusted clock signal CLK_IN outputted by the clock buffer 110 is also lower. On the contrary, when the voltage level of the level control signal VDD_CLK is higher, the voltage level of the adjusted clock signal CLK_IN outputted by the clock buffer 110 is also higher.

In some embodiments, the charge pump 120 can be configured to generate an output voltage (e.g., a system voltage VDD) which is larger than an input voltage (e.g., an output signal HV). For example, given that a system high voltage of an electronic device is 1.5V, and a voltage requirement for a specific high-voltage circuit in the electronic device is 9V, the charge pump 120 can be configured to convert the system high voltage 1.5V to generate an output signal with a voltage up to 9V, so as to drive the aforementioned specific high-voltage circuit. As the above operations may be known to those skilled in the art, the details thereof are omitted here for brevity.

In one instance, a control circuit of a conventional charge pump is provided with an amplifier (or a comparator) to generate a feedback control signal of an output voltage of the conventional charge pump, thereby increasing or decreasing the output voltage of the conventional charge pump. However, if the feedback control signal is converted into a digital control signal through an amplifier, the digital control signal will only include a high logic level and a low logic level. In other words, the control circuit only has two states: on and off, which causes a prolonged feedback response time of the control circuit. When the feedback response time of the control circuit is prolonged, the output voltage of the conventional charge pump will be either too high or too low. The present disclosure will describe how to improve the above problems in following paragraphs.

In some embodiments, a purpose of setting up the control circuit 130 is to detect whether an output voltage of the output signal HV of the charge pump 120 exceeds a preset voltage range, and to compare whether a voltage of the output signal HV is equal to a bias voltage of a current generated inside the control circuit 130. When the voltage level of the output signal HV is not equal to the bias voltage of the current generated inside the control circuit 130, the control circuit 130 is configured to activate a feedback mechanism to control the voltage clamp circuit 140 to change the voltage level of the adjusted clock signal CLK_IN outputted by the clock buffer 110, thereby changing the voltage level of the output signal HV of the charge pump 120. Details of how the control circuit 130 and the voltage clamp circuit 140 determine the voltage level of the adjusted clock signal CLK_IN will be further explained in following paragraphs.

Figure 3:
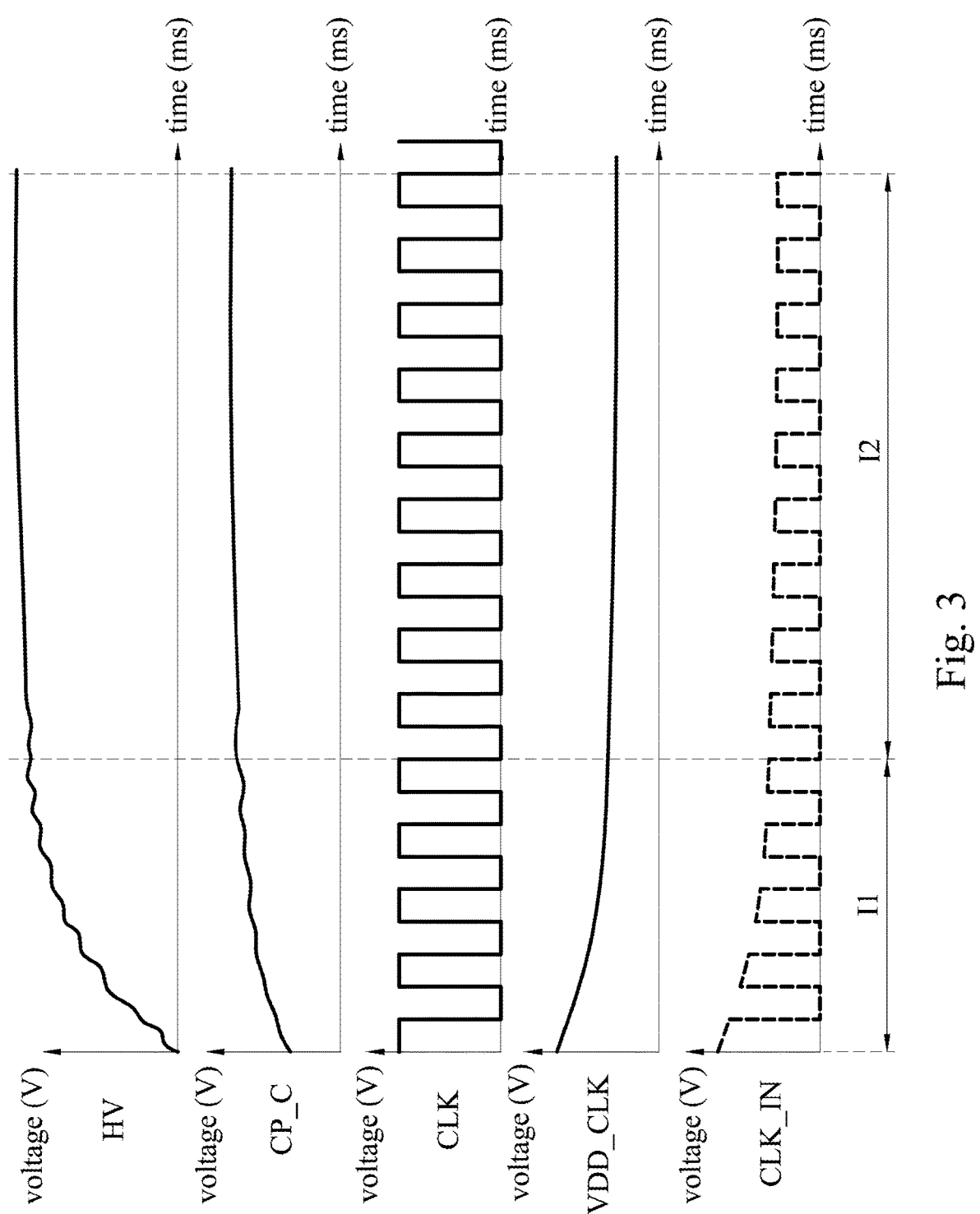
FIG. 3 depicts a signal timing diagram of a power supply circuit according to one embodiment of the present disclosure.
Figure 4A:
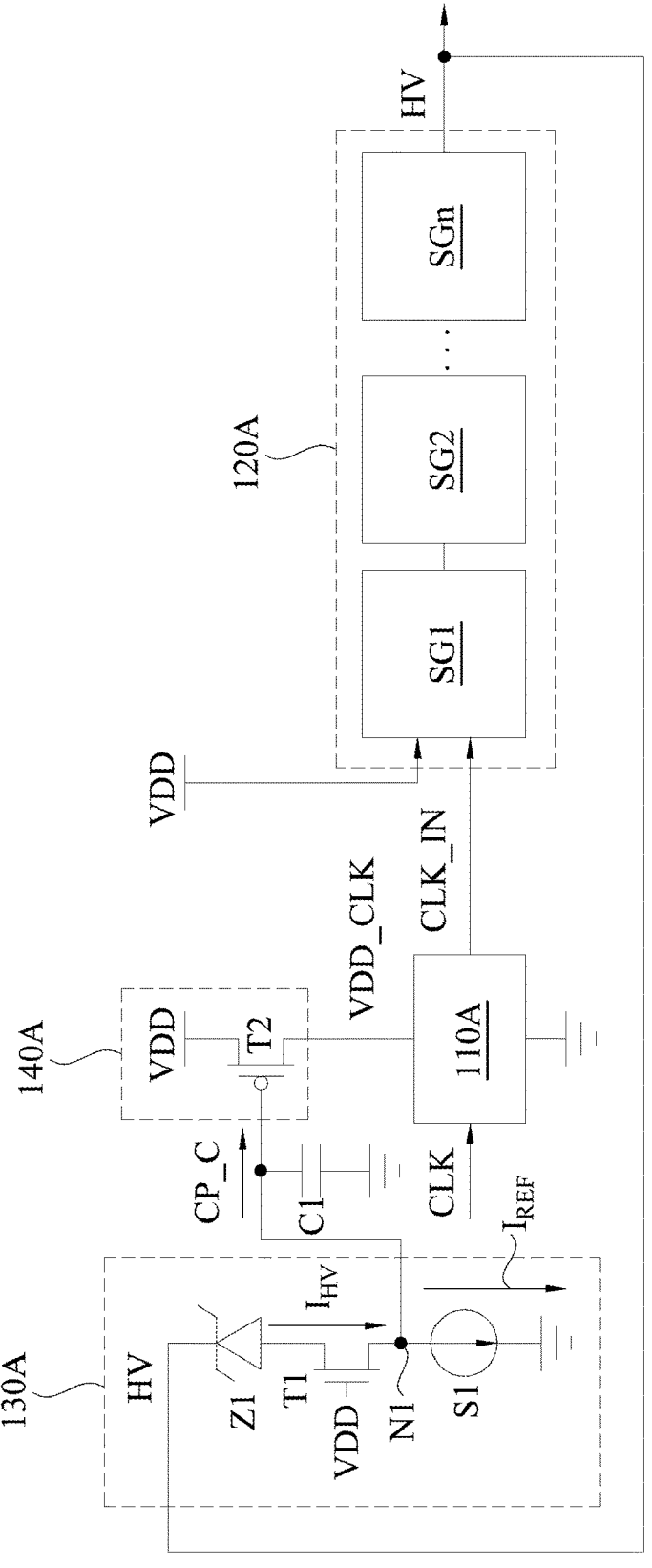
FIG. 4A depicts a schematic diagram of a power supply circuit according to one embodiment of the present disclosure.

In order to facilitate the understanding of the operations of the power supply circuit 100 in FIG. 1 of the present disclosure, please refer to FIG. 2 to FIG. 4A together. FIG. 2 depicts a flowchart of a dynamic voltage adjustment method 200 according to one embodiment of the present disclosure. FIG. 3 depicts a signal timing diagram of the power supply circuit 100 in FIG. 1 according to one embodiment of the present disclosure. FIG. 4A depicts a schematic diagram of a power supply circuit 100A according to one embodiment of the present disclosure. The power supply circuit 100A in FIG. 4A corresponds to the power supply circuit 100 in FIG. 1. The power supply circuit 100A includes a clock buffer 110A, a charge pump 120A, a control circuit 130A and a voltage clamp circuit 140A. Connections and operations of the clock buffer 110A, the charge pump 120A, the control circuit 130A and the voltage clamp circuit 140A are similar to those of corresponding components in the power supply circuit 100 in FIG. 1. For simplicity, only the differences are described below.

In some embodiments, the control circuit 130A includes a diode (e.g., a Zener diode Z1 is shown in the figure, but a content of the present disclosure is not limited to this embodiment), a transistor T1 and a constant current source S1. The voltage clamp circuit 140A includes a transistor T2. A cathode terminal of the Zener diode Z1 is coupled to the charge pump 120A, and is configured to output a voltage stabilizing signal according to the output signal HV. It should be noted that when a reverse voltage is applied, the Zener diode Z1 will maintain a constant voltage within a specific range and protect the transistor T1, the constant current source S1 and the transistor T2 of the voltage clamp circuit 140A from surge current and static electricity.

In the following descriptions, the upper terminal of an element is generally referred to as its first terminal. The first terminal of the transistor T1 is coupled to an anode terminal of the Zener diode Z1. A second terminal of the transistor T1 is coupled to a node N1 and the constant current source S1. A control terminal of the transistor T1 is conducted in response to the system voltage VDD. A reference current $I_{HV}$ passes through the transistor T1 to generate a voltage level at the node N1.

In some embodiments, the transistor T1 can be implemented using a N-type Metal-Oxide-Semiconductor Field-Effect Transistor (NMOS), and the transistor T2 can be implemented using a P-type Metal-Oxide-Semiconductor Field-Effect Transistor (PMOS). However, the present disclosure is not limited to this embodiment. For example, according to different designs of the charge pump control signal CP_C, the transistor T2 can also be implemented using NMOS.

In some embodiments, there is a capacitor C1 between the control circuit 130A and the voltage clamp circuit 140A. The capacitor C1 is coupled to the node N1 of the control circuit 130A and the transistor T2 of the voltage clamp circuit 140A. The capacitor C1 is charged or discharged to provide different voltage levels of the charge pump control signal CP_C.

In step 210, please refer to FIG. 2 to FIG. 4A, the clock buffer 110A is configured to receive the clock signal CLK, and is configured to generate the adjusted clock signal CLK_IN according to the clock signal CLK and the level control signal VDD_CLK.

In step 220, the charge pump 120A is configured to generate the output signal HV according to the adjusted clock signal CLK_IN and the system voltage VDD. A relationship between the output signal HV, the adjusted clock signal CLK_IN and the system voltage VDD is as shown in following Formula 1.

$$HV = VDD * K + CLK\_IN * M. \qquad \text{Formula 1}$$

In Formula 1, K and M are both positive integers. It should be noted that, in some embodiments, the charge pump 120A may be a Dickson charge pump, which includes multi-stage diode/capacitor units (e.g., diode/capacitor units SG1~SGn). One side of each of capacitors is boosted by the clock signal (e.g., the adjusted clock signal CLK_IN), and a voltage is accumulated through combinations of the capacitor and the diode to gradually achieve an effect of voltage doubling. Values of K and M are designed according to a quantity and requirements of the multi-stage diode/capacitor units (e.g., the diode/capacitor units SG1~SGn) of the charge pump 120A.

In step 230, please refer to FIG. 2 to FIG. 4A, for example, the transistor T2 can be a PMOS (the present disclosure is not limited to this embodiment). A voltage level of a drain terminal of the transistor T2 is the system voltage VDD, a voltage level of a gate terminal is the charge pump control signal CP_C and a voltage level of source terminal is the level control signal VDD_CLK. When the charge pump control signal CP_C is smaller than a difference between the system voltage VDD and a threshold voltage of the transistor T2, the transistor T2 is conducted and has on-resistance. When the charge pump control signal CP_C is smaller, the degree of conduction of the transistor T2 is greater (equivalent to smaller on-resistance in transistor T2), the voltage level of the level control signal VDD_CLK is higher; conversely, when the charge pump control signal CP_C is larger, the degree of conduction of the transistor T2 is smaller (equivalent to larger on-resistance in transistor T2), so that the voltage of the level control signal VDD_CLK is lower. A conduction resistor refers to a resistance behavior that occurs between the drain terminal and the source terminal when the transistor is in an on-state. The on-resistance may refer to the resistance caused by resistance behaviors.

In detail, when the voltage level of the output signal HV drops, the level control signal VDD_CLK rises. Therefore, the pulse amplitude of the adjusted clock signal CLK_IN generated by the clock buffer 110A is higher than that of the clock signal CLK, making the charge pump 120A raise the voltage level of the output signal HV. When the voltage level of the output signal HV rises, the level control signal VDD_CLK drops. Therefore, the pulse amplitude of the adjusted clock signal CLK_IN generated by the clock buffer 110A is lower than that of the clock signal CLK, making the charge pump 120A pull down the voltage level of the output signal HV, thereby achieving an effect of regulating the output signal HV. As the voltage level of the output signal HV generated by the charge pump 120A increases, the reference current $I_{HV}$ increases. The constant current source S1 is configured to output the reference current $I_{REF}$. The control circuit 130A is configured to generate the reference current $I_{HV}$ according to the output signal HV, and is configured to generate the charge pump control signal CP_C according to the reference current $I_{HV}$ and the reference current $I_{REF}$. When the reference current $I_{HV}$ increases to larger than the reference current $I_{REF}$, a shunt flows from the node N1 to the voltage clamp circuit 140A to charge the capacitor C1, causing the voltage level of the charge pump control signal CP_C to gradually increase, and the transistor T2 of the voltage clamp circuit 140A to gradually turn off in response to the voltage level of the charge pump control signal CP_C.

During gradually increasing of the on-resistance of the transistor T2, the transistor T2 remains in the on-state. A current path between the drain terminal and the source terminal of the transistor T2 gradually tightens with the increase of the charge pump control signal CP_C, but it is not completely turned off. In addition, when the voltage level of the output signal HV generated by the charge pump 120A decreases, the reference current $I_{HV}$ decreases accordingly. When the reference current $I_{HV}$ drops to below the reference current $I_{REF}$, the capacitor C1 discharges the node N1, causing the voltage level of the charge pump control signal CP_C to gradually decrease. At this time, the transistor T2 of the voltage clamp circuit 140A responds to the voltage level of the charge pump control signal CP_C so that the current tunnel between the drain terminal and the source terminal of the transistor T2 is conducted to a greater extent. In other words, the on-resistance of the transistor T2 gradually becomes smaller, and the current path between the drain terminal and the source terminal of the transistor T2 gradually expands with the charge pump control signal CP_C.

Figure 4B:
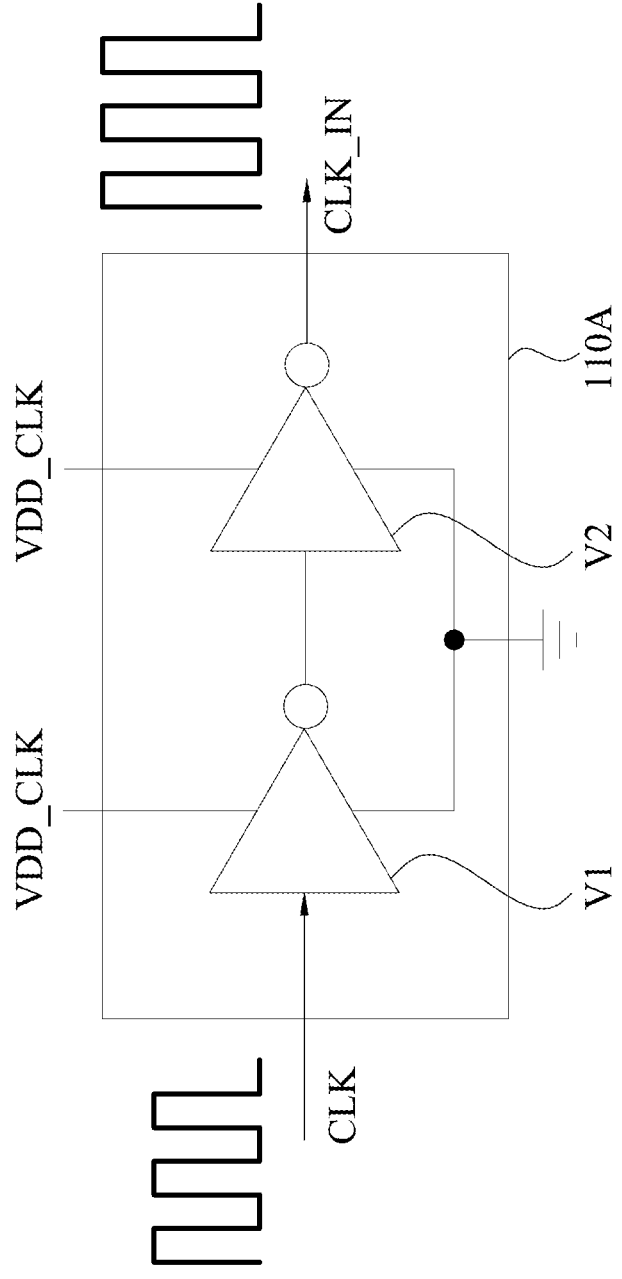
FIG. 4B depicts a schematic diagram of a clock buffer in the power supply circuit of FIG. 4A according to one embodiment of the present disclosure.

Please refer to FIG. 4B, FIG. 4B depicts schematic diagram of the clock buffer 110A in the power supply circuit of FIG. 4A according to one embodiment of the present disclosure, as shown in FIG. 4B, the clock buffer 110A includes an inverter V1 and an inverter V2. Please also refer to FIG. 3, the inverter V1 and the inverter V2 are configured to convert the clock signal CLK into the adjusted clock signal CLK_IN according to the voltage level of the level control signal VDD_CLK. An amplitude of the adjusted clock signal CLK_IN is controlled by the level control signal VDD_CLK.

In step 240, following the aforementioned step 230, at a stage 11 in FIG. 3, when the transistor T2 of the voltage clamp circuit 140A is gradually turned off, the voltage level of the level control signal VDD_CLK gradually decreases. In response to the voltage level of the level control signal VDD_CLK, the plurality of pulses of the adjusted clock signal CLK_IN outputted by the clock buffer 110A also gradually decrease as shown in the stage 11 of FIG. 3, thereby determining a voltage variation amount of the output signal HV in the stage 11. As shown in FIG. 3, the voltage level variation of the output signal HV changes more drastically in a fore-section of the stage 11, and gradually becomes stable in the stage 12.

The voltage level of the output signal HV is actually as shown in FIG. 3, oscillating between an upper limit and an lower limit of a preset voltage range, and the pulses of the charge pump control signal CP_C, the level control signal VDD_CLK and the adjusted clock signal CLK_IN change synchronously with the voltage level of the output signal HV. For example, the voltage level of the output signal HV may be 9 volts (V) or 10V, and the preset voltage range can be between ±5% and ±10% of the aforementioned voltage level. A value of the preset voltage range can be designed according to actual needs and is not limited to the aforementioned example.

Figure 5:
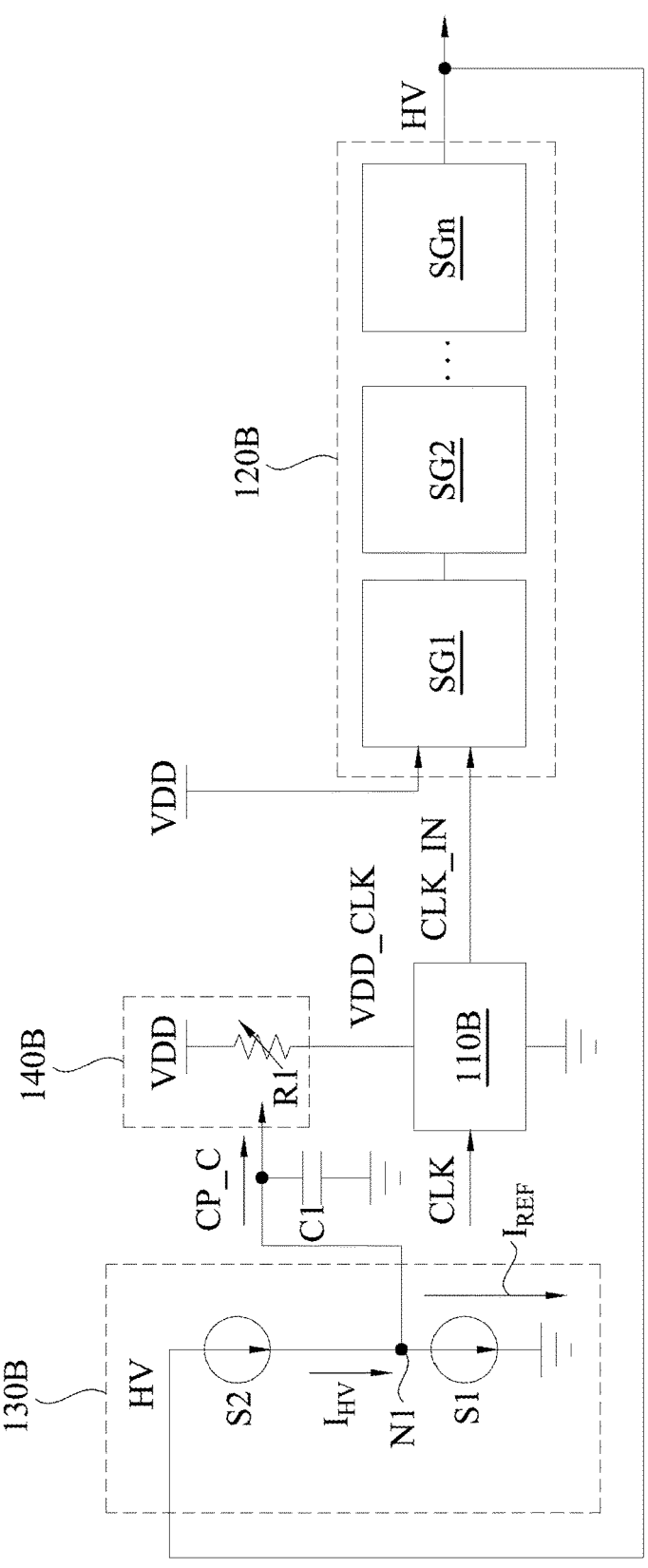
FIG. 5 depicts a schematic diagram of a power supply circuit according to one embodiment of the present disclosure.

FIG. 5 depicts a schematic diagram of a power supply circuit 100B according to one embodiment of the present disclosure. The power supply circuit 100B in FIG. 5 corresponds to the power supply circuit 100 in FIG. 1. The power supply circuit 100B includes a clock buffer 110B, a charge pump 120B, a control circuit 130B and a voltage clamp circuit 140B. The voltage clamp circuit 140B includes a variable resistor R1. The variable resistor R1 is coupled between the system voltage VDD and the clock buffer 110B, and is controlled by the charge pump control signal CP_C. Connections and operations of the clock buffer 110B, the charge pump 120B and the control circuit 130B are similar to those corresponding components in the power supply circuit 100 in FIG. 1 and the power supply circuit 100A in FIG. 4A respectively.

In some embodiments, the control circuit 130B includes a constant current source S1 and a variable current source S2. The variable current source S2 is coupled to the charge pump 120B, and is configured to convert the output signal HV into the reference current $I_{HV}$, where a current value of the reference current $I_{HV}$ is positively correlated with the voltage level of the output signal HV. The constant current source S1 is coupled to the variable current source S2, and is configured to output the reference current $I_{REF}$. In this embodiment, when the charge pump control signal CP_C is smaller, a voltage of the level control signal VDD_CLK is higher; conversely, when the charge pump control signal CP_C is larger, a voltage of the level control signal VDD_CLK is lower.

In detail, when the voltage level of the output signal HV drops, the level control signal VDD_CLK rises. Therefore, a pulse amplitude of the adjusted clock signal CLK_IN generated by the clock buffer 110B is higher than that of the clock signal CLK, so that the charge pump 120B is configured to raise the voltage level of the output signal HV. When the voltage level of the output signal HV rises, the voltage level of the charge pump control signal CP_C will also rise, so that the voltage level of the level control signal VDD_CLK will drop. Therefore, the pulse amplitude of the adjusted clock signal CLK_IN generated by the clock buffer 110B is lower than that of the clock signal CLK, so that the charge pump 120B pulls down the voltage level of the output signal HV, thereby achieving an effect of regulating the output signal HV.

As the voltage level of the output signal HV generated by the charge pump 120B increases, the variable current source S2 is controlled by the output signal HV, so the output reference current $I_{HV}$ increases. When the reference current $I_{HV}$ is greater than the reference current $I_{REF}$, a shunt is generated from the node N1 to the voltage clamp circuit 140B to charge the capacitor C1, causing the voltage level of the charge pump control signal CP_C to gradually increase. In response to the voltage level of the charge pump control signal CP_C increasing, a resistance of the variable resistor R1 of the voltage clamp circuit 140B gradually increases, causing the voltage level of the level control signal VDD_CLK to decrease. In addition, as the variable current source S2 is controlled by the output signal HV, when the voltage level of the output signal HV generated by the charge pump 120B decreases, the output reference current $I_{HV}$ also decreases. When the reference current $I_{HV}$ is lower than the reference current $I_{REF}$, the capacitor C1 discharges the node N1, causing the voltage level of the charge pump control signal CP_C to gradually decrease. A resistance of the variable resistor R1 of the voltage clamp circuit 140B gradually becomes smaller, causing the voltage level of the level control signal VDD_CLK to rise.

Figure 6:
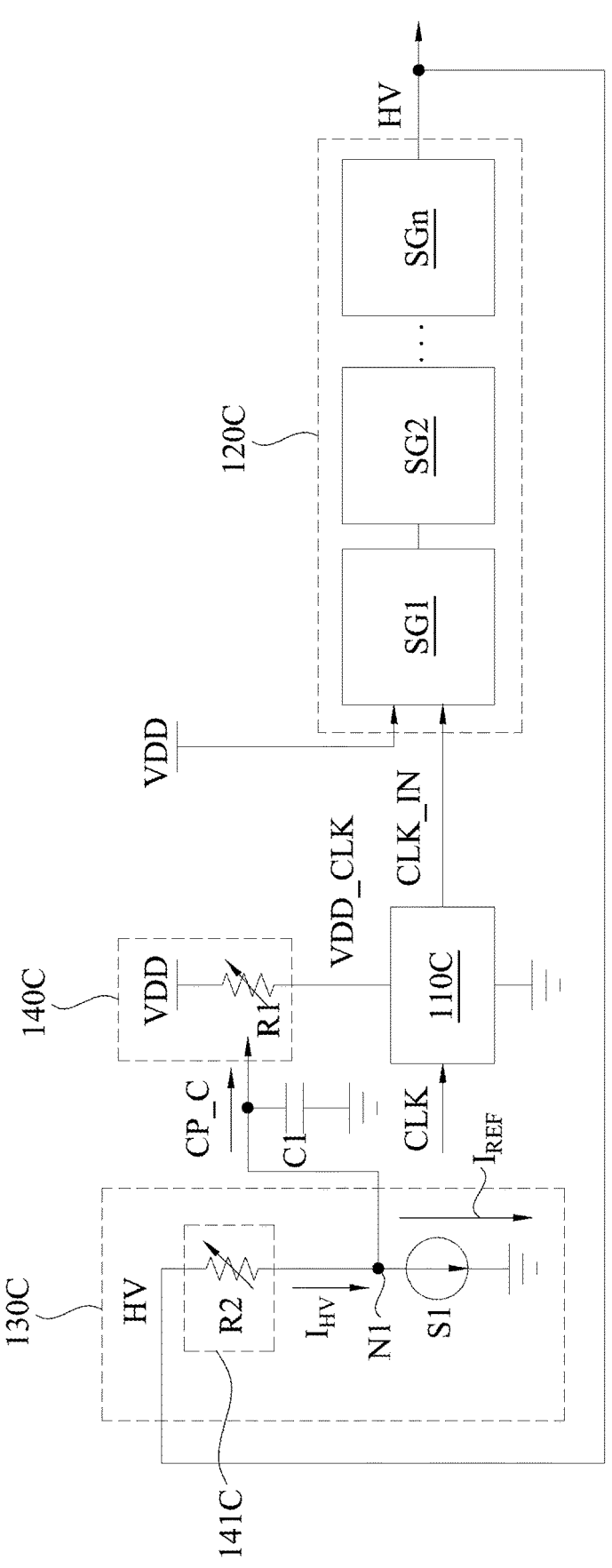
FIG. 6 depicts a schematic diagram of a power supply circuit according to one embodiment of the present disclosure.

FIG. 6 depicts a schematic diagram of a power supply circuit 100C according to one embodiment of the present disclosure. The power supply circuit 100C in FIG. 6 corresponds to the power supply circuit 100 in FIG. 1. The power supply circuit 100C includes a clock buffer 110C, a charge pump 120C, a control circuit 130C and a voltage clamp circuit 140C. The control circuit 130C includes a voltage clamp circuit 141C. Connections and operations of the clock buffer 110C, the charge pump 120C, the control circuit 130C and the voltage clamp circuit 140C are similar to the corresponding components in the power supply circuit 100 in FIG. 1, the power supply circuit 100A in FIG. 4A and the power supply circuit 100B in FIG. 5, respectively.

In some embodiments, different from the control circuit 130A and the control circuit 130B, the control circuit 130C includes a variable resistor R2 and a constant current source S1. The variable resistor R2 is coupled to the charge pump 120C, and is configured to convert the output signal HV into the reference current $I_{HV}$. The constant current source S1 is coupled to the voltage clamp circuit 141C, and is configured to generate a bias voltage at the node N1 according to the reference current $I_{HV}$ and the impedance of the constant current source S1. The voltage clamp circuit 141C includes a variable resistor R2. The variable resistor R2 is controlled by the output signal HV. The function of the variable resistor R2 is similar to that of the variable resistor R1, e.g., the resistance of the variable resistor R2 may become smaller in response to a lager the output signal HV, so that the voltage clamp circuit 141C outputs a larger reference current $I_{HV}$. Accordingly, the voltage clamp circuit 140C can be configured to adjust the voltage level of the charge pump control signal CP_C according to the voltage level of the output signal HV, in order to control the voltage level of the level control signal VDD_CLK. Operating principles of the clock buffer 110C and the charge pump 120C are similar to those of the corresponding components in the aforementioned embodiments, and are omitted here for brevity.

Figure 7:
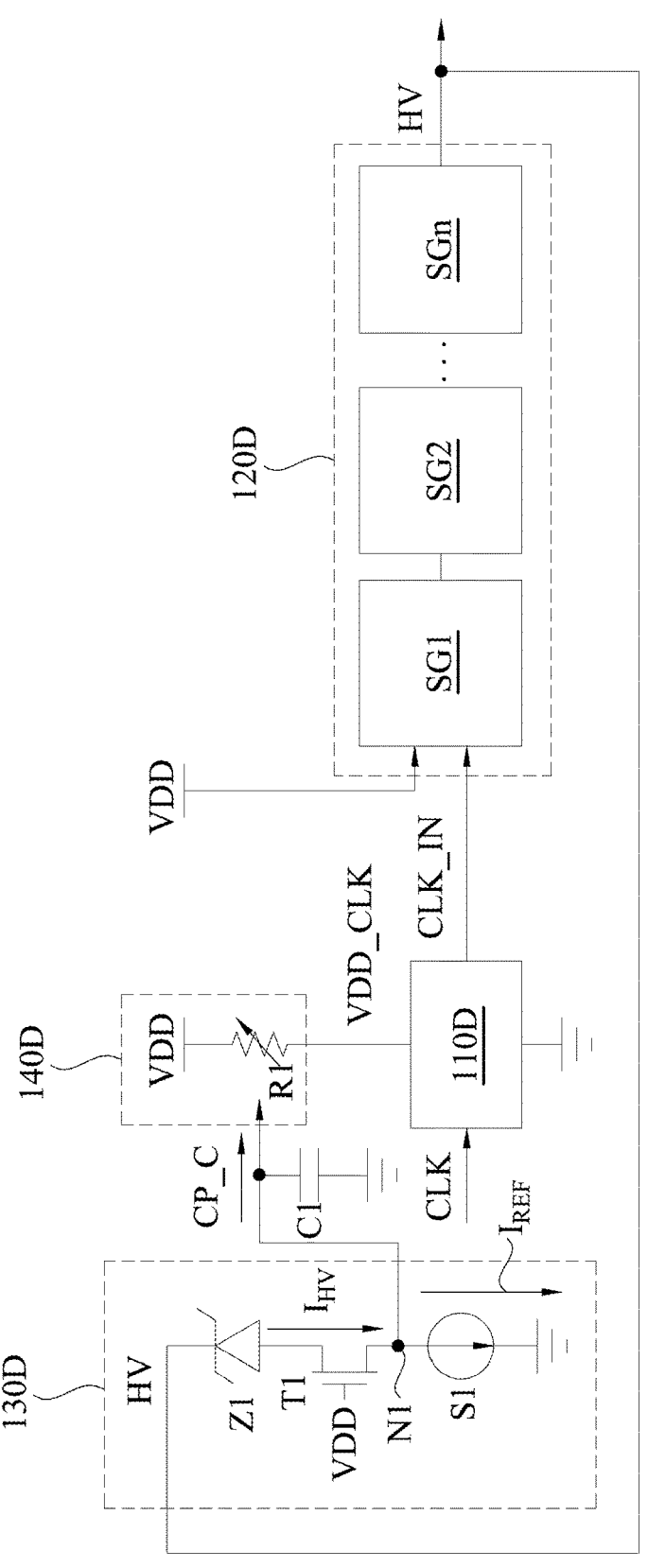
FIG. 7 depicts a schematic diagram of a power supply circuit according to one embodiment of the present disclosure.

FIG. 7 depicts a schematic diagram of a power supply circuit 100D according to one embodiment of the present disclosure. The power supply circuit 100D in FIG. 7 corresponds to the power supply circuit 100 in FIG. 1. The power supply circuit 100D includes a clock buffer 110D, a charge pump 120D, a control circuit 130D and a voltage clamp circuit 140D. Connections and operations of the clock buffer 110D and the charge pump 120D are similar to those of the corresponding clock buffer 110A and the corresponding charge pump 120A in FIG. 4A, and the details will not be repeated for brevity. In addition, connections and operations of the control circuit 130D are similar to those of the control circuit 130A in FIG. 4A. Connections and operations of the voltage clamp circuit 140D are similar to those of the voltage clamp circuit 140B in FIG. 5 or the voltage clamp circuit 140C in FIG. 6. As details of the control circuit 130D and the voltage clamp circuit 140D can be referred to FIG. 4A to FIG. 6, they are omitted here.

Figure 8:
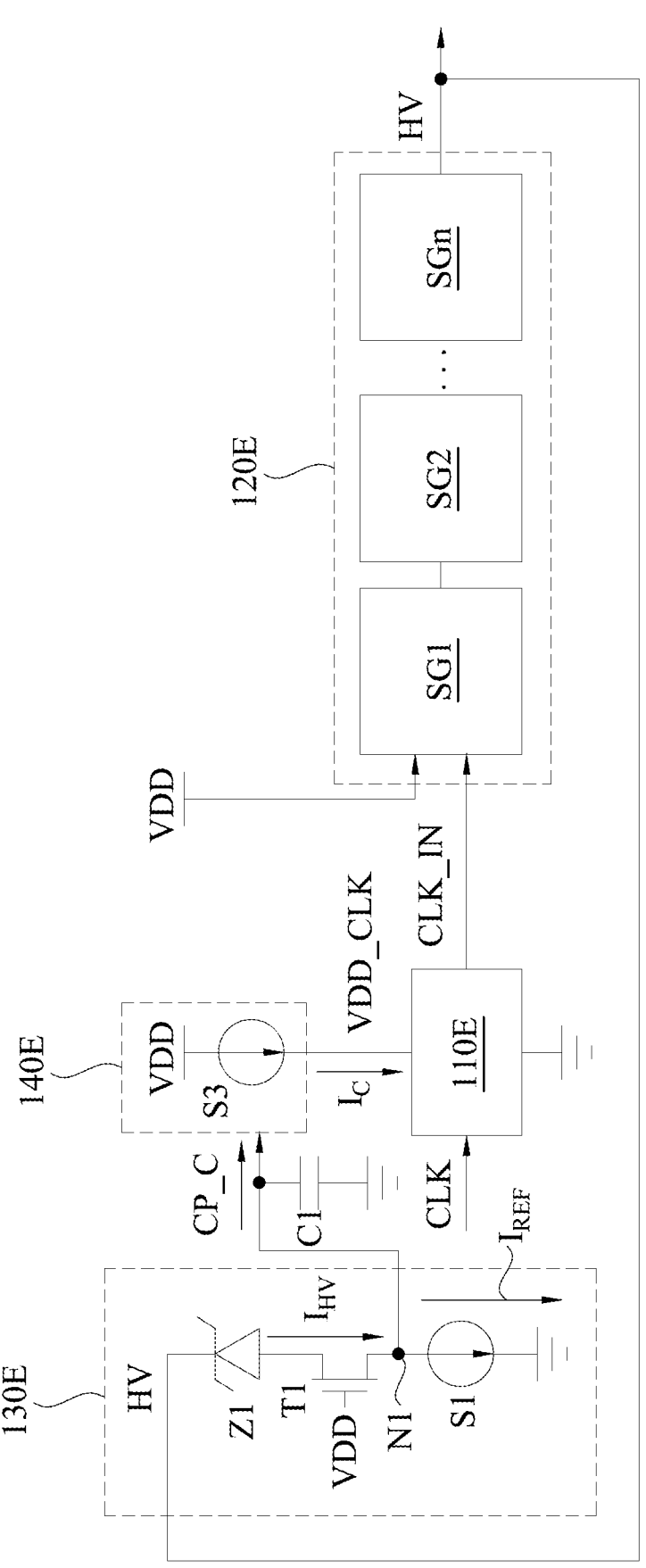
FIG. 8 depicts a schematic diagram of a power supply circuit according to one embodiment of the present disclosure.

FIG. 8 depicts a schematic diagram of a power supply circuit 100E according to one embodiment of the present disclosure. The power supply circuit 100E in FIG. 8 corresponds to the power supply circuit 100 in FIG. 1. The power supply circuit 100E includes a clock buffer 110E, a charge pump 120E, a control circuit 130E and a voltage clamp circuit 140E. As connections and operations of the clock buffer 110E, the charge pump 120E and the control circuit 130E are similar to those of the corresponding clock buffer 110A, the corresponding charge pump 120A and the corresponding control circuit 130A, only details of the voltage clamp circuit 140E are described below for brevity.

In some embodiments, the voltage clamp circuit 140E includes a variable current source S3. The variable current source S3 is coupled to the node N1 of the control circuit 130E, and is configured to receive the system voltage VDD and the charge pump control signal CP_C, so as to output the level control signal VDD_CLK according to the voltage level of the charge pump control signal CP_C. In this embodiment, when the charge pump control signal CP_C is smaller, a voltage of the level control signal VDD_CLK is higher; conversely, when the charge pump control signal CP_C is larger, a voltage of the level control signal VDD_CLK is lower.

In detail, as the voltage level of the output signal HV generated by the charge pump 120E increases, the reference current $I_{HV}$ will increase. When the reference current $I_{HV}$ is larger than the reference current $I_{REF}$, a shunt is generated from the node N1 to the voltage clamp circuit 140E to charge the capacitor C1, causing a voltage level of the charge pump control signal CP_C to gradually increase. The variable current source S3 of the voltage clamp circuit 140E reduces an output current $I_C$ in response to the voltage level of the charge pump control signal CP_C. In addition, as the voltage level of the output signal HV generated by the charge pump 120E decreases, the reference current $I_{HV}$ also decreases. When the reference current $I_{HV}$ is lower than reference current $I_{REF}$, the capacitor C1 discharges the node N1, causing the voltage level of the charge pump control signal CP_C to gradually decrease. In response to increasing of the voltage level of the charge pump control signal CP_C, the variable current source S3 of the voltage clamp circuit 140E is configured to output a lower current $I_C$, that is, outputs a lower leveled control signal VDD_CLK to the clock buffer 110E. Since the level control signal VDD_CLK is generated according to the current $I_C$ and an internal resistor of the clock buffer 110E, when the current $I_C$ is larger, the voltage of the level control signal VDD_CLK is larger, and vice versa.

Figure 9:
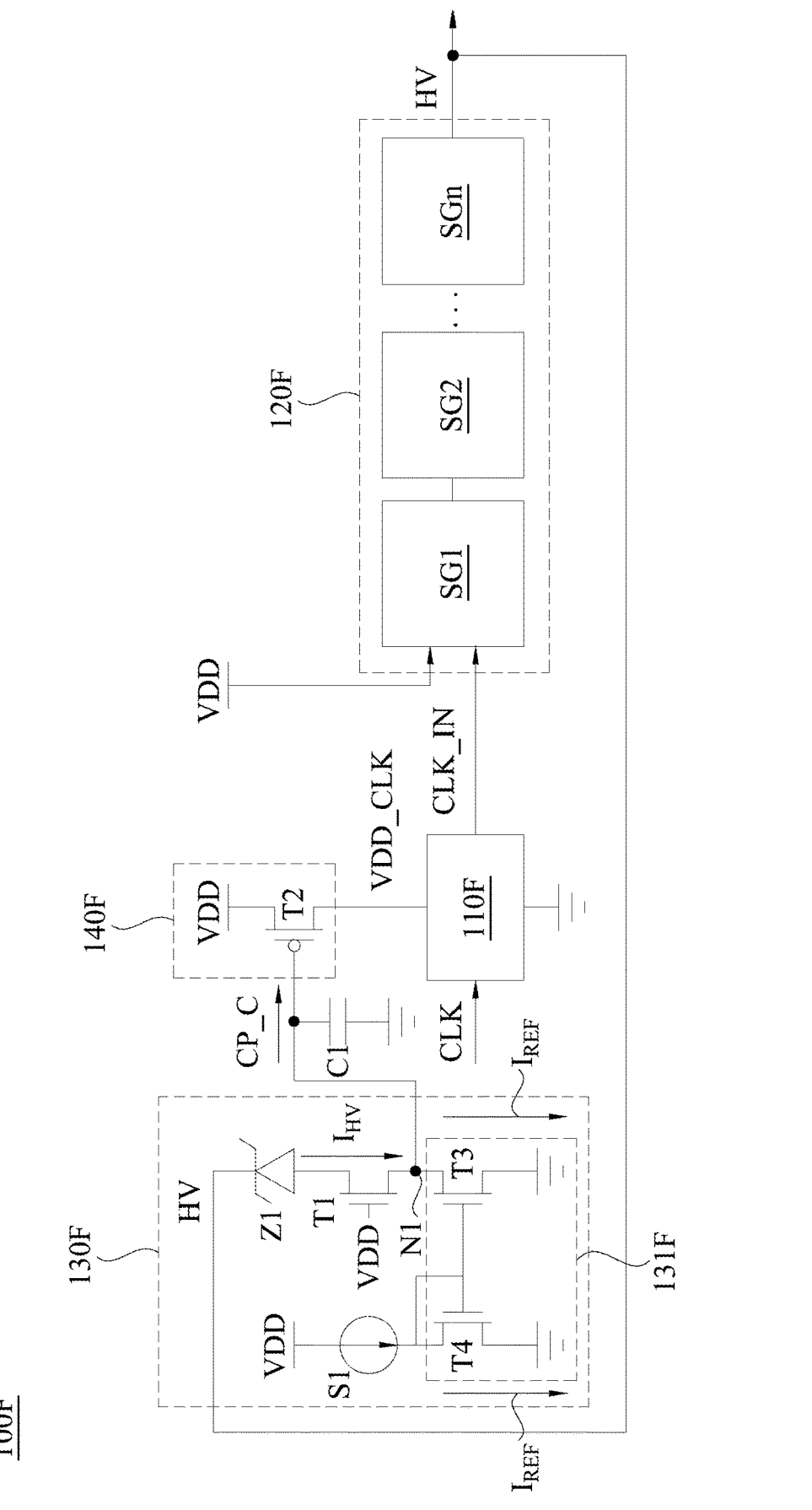
FIG. 9 depicts a schematic diagram of a power supply circuit according to one embodiment of the present disclosure.

FIG. 9 depicts a schematic diagram of a power supply circuit 100F according to one embodiment of the present disclosure. The power supply circuit in 100F corresponds to the power supply circuit 100 in FIG. 1. The power supply circuit 100F includes a clock buffer 110F, a charge pump 120F, a control circuit 130F and a voltage clamp circuit 140F. As connections and operations of the clock buffer 110F, the charge pump 120F and the voltage clamp circuit 140F are similar to that of the corresponding clock buffer 110A, the corresponding charge pump 120A and the corresponding voltage clamp circuit 140A in FIG. 4A respectively, only details about the control circuit 130F are described below for brevity.

In some embodiments, the control circuit 130F includes a Zener diode Z1, a transistor T1 and a current mirror circuit 131F. The current mirror circuit 131F is coupled to the transistor T1, and is configured to copy the reference current $I_{REF}$ of the constant current source S1 to output to a second terminal of the transistor T1. In some embodiments, the current mirror circuit 131F includes a transistor T3 and a transistor T4. The transistor T3 is coupled to the node N1. A drain terminal of the transistor T3 is coupled to a ground terminal and a source terminal of the transistor T1. A first terminal of the constant current source S1 is coupled to the system voltage VDD. A second terminal of the constant current source S1 is coupled to a drain terminal of the transistor T4. A source terminal of the transistor T4 is coupled to the ground terminal. A drain terminal and a gate terminal of the transistor T4 electrically connected to each other, and is connected to the gate terminal of the transistor T3. It should be noted that characteristic of a current mirror is that an output current of the current mirror can remain constant regardless of load conditions. The current mirror circuit 131F is an analog circuit, but the present disclosure is not limited to these embodiments.

In some embodiments, the aforementioned level control signal VDD_CLK and the output signal HV are both analog signals, but the present disclosure is not limited to these embodiments. In addition, although in the aforementioned embodiments of the present disclosure, the level control signal VDD_CLK is inversely proportional to the charge pump control signal CP_C as a means of stabilizing the output signal HV. However, in some derivative variations of the present disclosure, the voltage level of the level control signal VDD_CLK can be designed to be proportional to the charge pump control signal CP_C as a means of stabilizing the output signal HV. For example, it can be achieved by adding an inverting circuit (e.g., an inverter) or changing the type of transistors (e.g., replacing PMOS with NMOS, or replacing NMOS with PMOS).

In some embodiments, the transistors T1, T3 and T4 may be implemented using NMOS, the transistor T2 may be implemented using PMOS. However, the present disclosure is not limited to these embodiments. For example, according to different designs of the charge pump control signal CP_C, the transistor T2 can also be implemented using NMOS.

Based on the aforementioned embodiments, the present disclosure provides a power supply circuit and a dynamic voltage adjustment method. Through the designs of a power supply circuit of the present disclosure, there is no need for using an amplifier to compare voltages to output a digital control signal, thereby continuously adjusting an output voltage of a charge pump within a preset voltage range. In addition, a power supply circuit can significantly reduce the area occupied by components and reduce power consumption, thereby reducing the layout complexity of the circuit.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A power supply circuit, comprising:
a clock buffer, configured to generate an adjusted clock signal according to a clock signal and a level control signal, wherein the clock signal comprises a preset level;
a charge pump, coupled to the clock buffer, and configured to generate an output signal according to the adjusted clock signal and a system voltage;
a control circuit, coupled to the charge pump, wherein the control circuit is configured to generate a charge pump control signal according to the output signal; and
a first voltage clamp circuit, coupled between the control circuit and the clock buffer, and configured to receive the system voltage and the charge pump control signal, wherein the first voltage clamp circuit is configured to output the level control signal according to the charge pump control signal, wherein the adjusted clock signal comprises an adjusted level in response to a level of the level control signal, wherein the control circuit comprises:

a constant current source, coupled between a first node and a ground terminal, and configured to generate a first reference current flowing from the first node to the ground terminal, wherein the control circuit is configured to generate a second reference current according to the output signal and further generate the charge pump control signal according to the first reference current and the second reference current, and the second reference current flows to the first node.

2. The power supply circuit of claim 1, wherein the first voltage clamp circuit further comprises a first variable resistor, wherein a resistance of the first variable resistor changes with a level of the charge pump control signal, wherein the control circuit further comprises:

a second voltage clamp circuit, coupled to the charge pump and the constant current source, and configured to generate the second reference current according to the output signal, wherein the second voltage clamp circuit comprises:

a second variable resistor, wherein a resistance of the second variable resistor changes with a level of the output signal to adjust a level of the second reference current.

3. The power supply circuit of claim 1, wherein the control circuit further comprises:

a variable current source, coupled to the charge pump and the constant current source, and configured to convert the output signal into the second reference current;

wherein the first voltage clamp circuit comprises:

a first variable resistor, wherein a resistance of the first variable resistor changes with a level of the charge pump control signal.

4. The power supply circuit of claim 1, wherein the first voltage clamp circuit further comprises a first variable resistor, wherein a resistance of the first variable resistor changes with a level of the charge pump control signal.

5. The power supply circuit of claim 1, wherein the control circuit further comprises:

a second voltage clamp circuit, coupled to the charge pump and the first node, and configured to generate the second reference current to the first node according to the output signal, wherein the second voltage clamp circuit comprises:

a variable resistor, wherein a resistance of the variable resistor changes with a level of the output signal to adjust a level of the second reference current.

6. The power supply circuit of claim 1, wherein the control circuit further comprises:

a variable current source, coupled to the charge pump and the first node, and configured to convert the output signal into the second reference current flowing to the first node.

7. The power supply circuit of claim 1, further comprising:

a capacitor, comprising a first terminal coupled to the first node and a second terminal coupled to the ground terminal, and configured to be charged or discharged to provide different voltage levels of the charge pump control signal.

8. The power supply circuit of claim 7, wherein the capacitor is charged when the second reference current increases to larger than the first reference current.

9. The power supply circuit of claim 7, wherein the capacitor is discharged when the second reference current drops to below the first reference current.

10. A power supply circuit, comprising:

a clock buffer, configured to generate an adjusted clock signal according to a clock signal and a level control signal, wherein the clock signal comprises a preset level;

a charge pump, coupled to the clock buffer, and configured to generate an output signal according to the adjusted clock signal and a system voltage;

a control circuit, coupled to the charge pump, wherein the control circuit is configured to generate a charge pump control signal according to the output signal; and a first voltage clamp circuit, coupled between the control circuit and the clock buffer, and configured to receive the system voltage and the charge pump control signal, wherein the first voltage clamp circuit is configured to output the level control signal according to the charge pump control signal, wherein the adjusted clock signal comprises an adjusted level in response to a level of the level control signal, wherein the control circuit comprises:

a constant current source, coupled to a first node, and configured to generate a first reference current flowing from the first node to a ground terminal, wherein the control circuit is configured to generate a second reference current according to the output signal and further generate the charge pump control signal according to the first reference current and the second reference current, and wherein the control circuit further comprises:

a Zener diode, coupled to the charge pump, and configured to output a second reference current according to the output signal; and a first transistor, wherein a first terminal of the first transistor is coupled to the Zener diode, and a second terminal of the first transistor is coupled to the constant current source.

11. The power supply circuit of claim 10, wherein the first voltage clamp circuit further comprises:

a first variable resistor, wherein a resistance of the first variable resistor changes with a level of the charge pump control signal.

12. The power supply circuit of claim 10, wherein the first voltage clamp circuit further comprises:

a variable current source, coupled to the control circuit, and configured to receive the system voltage, wherein a level of an output current of the variable current source changes with a level of the charge pump control signal, wherein the level of the level control signal is proportional to a level of the output current.

13. The power supply circuit of claim 10, wherein the first voltage clamp circuit comprises:

a second transistor, comprising:

a first terminal, configured to receive the system voltage;

a second terminal, coupled to the clock buffer, and configured to output the level control signal to the clock buffer; and a control terminal, coupled to the control circuit, and configured to receive the charge pump control signal.

14. The power supply circuit of claim 13, wherein the control circuit further comprises:

a third transistor, wherein a first terminal of the third transistor is coupled to the second terminal of the first transistor and a ground terminal; and a fourth transistor, wherein a first terminal of the constant current source is coupled to the system voltage, a second terminal of the constant current source is coupled to a first terminal of the fourth transistor, a second terminal of the fourth transistor is coupled to the ground terminal, a control terminal of the fourth transistor is coupled to the first terminal of the fourth transistor and a control terminal of the third transistor.

15. A dynamic voltage adjustment method, adapted to a power supply circuit, wherein the power supply circuit comprises a clock buffer, a charge pump, a control circuit and a voltage clamp circuit, wherein the charge pump is coupled to the clock buffer, the control circuit is coupled to the charge pump, the voltage clamp circuit is coupled between the control circuit and the clock buffer, wherein the dynamic voltage adjustment method comprises:

generating, by the clock buffer, an adjusted clock signal according to a clock signal and a level control signal, wherein the clock signal comprises a preset level;

generating, by the charge pump, an output signal according to the adjusted clock signal and a system voltage;

generating, by the control circuit, a charge pump control signal according to the output signal; and receiving, by the voltage clamp circuit, the system voltage and generating the level control signal according to the charge pump control signal, wherein the adjusted clock signal comprises an adjusted level in response to a level of the level control signal, wherein generating the charge pump control signal according to the output signal by the control circuit comprises: charging or discharging a capacitor coupled between the control circuit and the voltage clamp circuit according to a first reference current and a second reference current to generate the charge pump control signal.

16. The dynamic voltage adjustment method of claim 15, wherein the control circuit is configured to generate the first reference current according to the output signal, a constant current source of the control circuit is configured to provide the second reference current, wherein generating the charge pump control signal according to the output signal by the control circuit further comprises:

outputting, by the control circuit, the charge pump control signal according to the first reference current and the second reference current.

17. The dynamic voltage adjustment method of claim 15, wherein generating the charge pump control signal according to the output signal by the control circuit further comprises:

charging the capacitor when the first reference current is lower than the second reference current; or discharging the capacitor when the first reference current is larger than the second reference current.

18. The dynamic voltage adjustment method of claim 15, wherein each of the level control signal and the output signal is an analog signal.

\*   \*   \*   \*   \*